United States Patent
Zuo (10) Patent No.: US 10,992,925 B2
(45) Date of Patent: Apr. 27, 2021

(54) 3D SPECTACLE LENS AND METHOD FOR DRIVING THE SAME, AND 3D GLASSES AND METHOD FOR DRIVING THE SAME

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventor: Xiongcan Zuo, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 256 days.

(21) Appl. No.: 16/103,826

(22) Filed: Aug. 14, 2018

(65) Prior Publication Data
US 2019/0230345 A1    Jul. 25, 2019

(30) Foreign Application Priority Data

Jan. 24, 2018    (CN) .......................... 201810067632.8

(51) Int. Cl.
*H04N 13/332*    (2018.01)
*G02B 30/25*    (2020.01)
(Continued)

(52) U.S. Cl.
CPC ......... *H04N 13/332* (2018.05); *G02B 5/3025* (2013.01); *G02B 30/25* (2020.01);
(Continued)

(58) Field of Classification Search
CPC .. G02B 27/26; G02B 5/3025; G02B 27/2264; G02B 30/24; G02B 30/25; G02C 7/088;
(Continued)

(56) References Cited

U.S. PATENT DOCUMENTS 5,172,256 A * 12/1992 Sethofer .................. A61F 9/023
349/116
2002/0047837 A1* 4/2002 Suyama ................ G02F 1/1333
345/204
(Continued)

FOREIGN PATENT DOCUMENTS

| CN | 103207484 A | 7/2013 |
|---|---|---|
| CN | 103235441 A | 8/2013 |

(Continued)

OTHER PUBLICATIONS

First Office Action for Chinese Application No. 201810067632.8, dated Jan. 10, 2020, 12 Pages.
(Continued)

*Primary Examiner* — Christopher S Kelley
*Assistant Examiner* — Kathleen M Walsh
(74) *Attorney, Agent, or Firm* — Brooks Kushman P.C.

(57) ABSTRACT

The present disclosure provides a 3D spectacle lens and a method for driving the same, and a 3D glasses and a method for driving the same. The 3D spectacle lens includes: a first substrate and a second substrate arranged opposite to each other; and a guest-host liquid crystal layer arranged between the first substrate and the second substrate, the guest-host liquid crystal layer including liquid crystal molecules and dichroic dye molecules.

16 Claims, 2 Drawing Sheets

(51) Int. Cl.
*G02F 1/1335* (2006.01)
*G02C 7/08* (2006.01)
*G02B 5/30* (2006.01)
*G02F 1/137* (2006.01)
*G02F 1/13363* (2006.01)

(52) U.S. Cl.
CPC ......... *G02C 7/088* (2013.01); *G02F 1/13725* (2013.01); *G02F 1/133528* (2013.01); *G02F 1/133638* (2021.01)

(58) Field of Classification Search
CPC .......... G02F 1/133528; G02F 1/13725; G02F 2001/133638; G02F 1/13306; G02F 1/1333; G02F 1/13363; G02F 1/134309; H04N 13/332
USPC .......................................................... 348/53
See application file for complete search history.

(56) References Cited

U.S. PATENT DOCUMENTS

| | | | | |
|---|---|---|---|---|
| 2010/0073605 | A1* | 3/2010 | Masutani | C09K 19/544 349/86 |
| 2011/0205626 | A1* | 8/2011 | Saylor | G02C 7/12 359/465 |
| 2013/0258266 | A1* | 10/2013 | Sukhomlinova | C09K 19/601 349/179 |
| 2014/0132862 | A1* | 5/2014 | Chen | G02F 1/29 349/15 |
| 2016/0048055 | A1 | 2/2016 | Dong et al. | |
| 2017/0336641 | A1* | 11/2017 | von und zu Liechtenstein | G06F 3/147 |
| 2018/0210218 | A1 | 7/2018 | Wei et al. | |

FOREIGN PATENT DOCUMENTS

| | | | | |
|---|---|---|---|---|
| CN | 105842951 | A | | 8/2016 |
| CN | 106547156 | A | | 3/2017 |
| CN | 206074969 | U | * | 4/2017 |
| CN | 206074969 | U | | 4/2017 |
| WO | WO-2014153951 | A1 | * | 10/2014 ............. G02B 30/25 |
| WO | 2015177356 | A1 | | 11/2015 |

OTHER PUBLICATIONS

1st Chinese Office Action, English Translation.
CN103207484A, English Abstract and Machine Translation.
CN103235441A, English Abstract and U.S. Equivalent U.S. Pub. No. 2016/0048055.
CN105842951A, English Abstract and U.S. Equivalent U.S. Pub. No. 2018/0210218.
CN106547156A, English Abstract and Machine Translation.
CN206074969U, English Abstract and Machine Translation.
WO2015177356A1, English Abstract and Machine Translation.

* cited by examiner

3D SPECTACLE LENS AND METHOD FOR DRIVING THE SAME, AND 3D GLASSES AND METHOD FOR DRIVING THE SAME

CROSS-REFERENCE TO RELATED APPLICATION

This application claims priority to Chinese Patent Application No. 201810067632.8 filed on Jan. 24, 2018, which is incorporated herein by reference in its entirety.

TECHNICAL FIELD

The present disclosure relates to the field of display technology, in particular to a three-dimensional (3D) spectacle lens and a method for driving the same, and a 3D glasses and a method for driving the same.

BACKGROUND

The 3D display technology is to receive different images respectively by the left and right eyes of a person, then to superimpose and reproduce the image information by the brain to form front-back, up-down, left-right, far-near images and other images having stereoscopic effects. At present, the commonly used 3D display technology is a glasses-type 3D display technology, that is, a 3D display is realized by a display screen and a shutter-type 3D glasses. In operation, the display image is divided into two parts by frame, to form two sets of images corresponding to the left and right eyes respectively. The two sets of images are successively displayed alternately through the display screen, while an infrared signal transmitter synchronously controls the left and right lens switches of the shutter-type 3D glasses, such that the left and right eyes are capable of seeing the corresponding images at the right moment.

The spectacle lens of the shutter-type 3D glasses in the related art generally includes two independently controllable TN mode liquid crystal screens, and polarizers being orthogonal to each other arranged in front and behind each of the liquid crystal screens. When a user watches a 3D image by using a 3D glasses, it is necessary to ensure that the angle of the absorption axis of the front polarizer matches the angle of the absorption axis of the linearly polarized light beam emitted by the display screen, and then to control the liquid crystal molecules in the liquid crystal to deflect the liquid crystal, such that the screen is switched between a light-passing through state and a non-light-passing through state, thereby allowing a user to watch a 3D image by wearing the 3D glasses. However, when a user wears a 3D glasses to view a 3D image, it is required that the angle of the absorption axis of the front polarizer of the 3D glasses matches the angle of the absorption axis of the linearly polarized light beam emitted by the display screen. Thus, when a user wears a 3D glasses to view a 3D image, the user may only watch the 3D image horizontally rather than inclinedly, otherwise the quality of the watched 3D image will be reduced, and even a problem of being unable to watch the 3D image arises.

SUMMARY

A first aspect of the present disclosure provides a three-dimensional (3D) spectacle lens including:

a first substrate and a second substrate arranged opposite to each other; and a guest-host liquid crystal layer arranged between the first substrate and the second substrate, the guest-host liquid crystal layer including liquid crystal molecules and dichroic dye molecules.

Optionally, a mass percentage of the dichroic dye molecules in the guest-host liquid crystal layer is 0.5% to 2.5%.

Optionally, the dichroic dye molecules include azo dye molecules.

Optionally, the dichroic dye molecules include trans isomer azo dye molecules.

Optionally, the 3D spectacle lens further includes a λ/4 wave plate arranged on a light-entering side of the 3D spectacle lens.

Optionally, the 3D spectacle lens further includes: an electrode structure arranged between the guest-host liquid crystal layer and the second substrate, and the electrode structure includes a first electrode and a second electrode insulated from each other.

Optionally, the first electrode and the second electrode are arranged in a same layer and both are comb-like electrodes.

Optionally, the first electrode and the second electrode are arranged in different layers, and an insulating layer is arranged between the first electrode and the second electrode, and wherein the first electrode is a comb-like electrode and the second electrode is a planar electrode.

Optionally, the 3D spectacle lens further includes an alignment layer arranged between the first substrate and the second substrate and on both sides of the guest-host liquid crystal layer.

A second aspect of the present disclosure provides a 3D glasses including the above 3D spectacle lenses.

A third aspect of the present disclosure provides a method for driving the above 3D spectacle lens including: applying a driving electric field to the guest-host liquid crystal layer such that the liquid crystal molecules in the guest-host liquid crystal layer drive the dichroic dye molecules in the guest-host liquid crystal layer to deflect under the control of the driving electric field.

Optionally, the applying the driving electric field to the guest-host liquid crystal layer such that the liquid crystal molecules in the guest-host liquid crystal layer drive the dichroic dye molecules in the guest-host liquid crystal layer to deflect under the control of the driving electric field includes:

applying the driving electric field to the guest-host liquid crystal layer such that an optical axis of each the dichroic dye molecules in the 3D spectacle lens is perpendicular to a polarization direction of a received linearly polarized light beam under the control of the driving electric field; or applying the driving electric field to the guest-host liquid crystal layer such that an optical axis of each the dichroic dye molecules in the 3D spectacle lens is parallel to a polarization direction of a received linearly polarized light beam under the control of the driving electric field.

Based on the technical solution of the above 3D glasses, a fourth aspect of the present disclosure provides a method for driving the above 3D glasses, the 3D glasses including a first 3D spectacle lens and a second 3D spectacle lens; the method including:

determining a target 3D spectacle lens from the first 3D spectacle lens and the second 3D spectacle lens; and applying a first driving electric field to a target guest-host liquid crystal layer in the target 3D spectacle lens such that the target 3D spectacle lens is capable of allowing a received linearly polarized light beam to pass therethrough.

Optionally, the above method further including:

determining a non-target 3D spectacle lens from the first 3D spectacle lens and the second 3D spectacle lens; and applying a second driving electric field to a non-target guest-host liquid crystal layer in the non-target 3D spectacle lens, such that the non-target 3D spectacle lens is incapable of allowing a received linearly polarized light beam to pass therethrough.

BRIEF DESCRIPTION OF THE DRAWINGS

The drawings described herein are intended to provide a further understanding of the present disclosure, and constitute a part of this disclosure. The illustrative embodiments of the present disclosure and the description thereof are intended to illustrate the present disclosure, and do not constitute an improper limitation of the present disclosure, in which.

DETAILED DESCRIPTION

In order to further illustrate the 3D spectacle lens and the method for driving the same, and the 3D glasses and the method for driving the same provided by the embodiments of the present disclosure, the present disclosure will be described in detail hereinafter in conjunction with the drawings.

Figure 1:
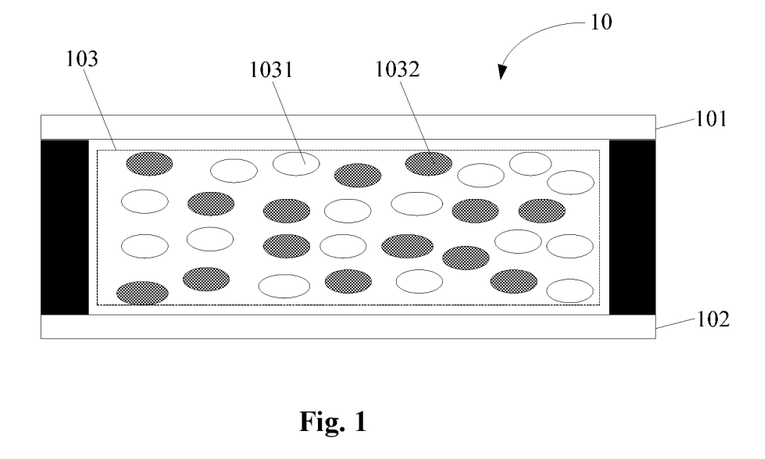
FIG. 1 is a schematic diagram of a 3D spectacle lens according to an embodiment of the present disclosure.

As shown in FIG. 1, an embodiment of the present disclosure provides a 3D spectacle lens 10 including: a first substrate 101 and a second substrate 102 arranged opposite to each other; and a guest-host liquid crystal layer 103 arranged between the first substrate 101 and the second substrate 102. The guest-host liquid crystal layer 103 includes liquid crystal molecules 1031 and dichroic dye molecules 1032, and each liquid crystal molecule 1031 is capable of driving each dichroic dye molecule 1032 to deflect under the control of the driving electric field.

Specifically, the guest-host liquid crystal layer 103 includes liquid crystal molecules 1031 and dichroic dye molecules 1032, in which each liquid crystal molecule 1031 serves as a host, and each dichroic dye molecule 1032 serves as a guest. The liquid crystal molecules 1031 are deflected by the driving electric field, thereby driving the dichroic dye molecules 1032 to deflect such that a long axis of each liquid crystal molecule 1031 is maintained to be parallel to an optical axis of each dichroic dye molecule 1032. Since each of the dichroic dye molecule 1032 has property of anisotropic optical absorbance, it is possible to control the deflection angle of the liquid crystal molecules 1031 and the dichroic dye molecules 1032 by applying different driving electric fields, thereby controlling the angle formed between the optical axis of each dichroic dye molecule 1032 and the polarization direction of the received linearly polarized light beam such that each dichroic dye molecule 1032 is capable of allowing the linearly polarized light beam to be absorbed or to pass therethrough according to actual needs.

More specifically, the dichroic dye molecules 1032 may be classified into positive (P-type) dichroic dye molecules and negative (N-type) dichroic dye molecules according to the orientation relationship between the absorption axis and the molecular axis of each dichroic dye molecule 1032. As for the positive dichroic dye molecules, when the optical axis of each positive dichroic dye molecule is perpendicular to the polarization direction of the linearly polarized light beam, the positive dichroic dye molecules may allow all the linearly polarized light beam to pass therethrough; and when the optical axis of each positive dichroic dye molecule is parallel to the polarization direction of the linearly polarized light beam, the positive dichroic dye molecules may absorb all the linearly polarized light beam. As for negative dichroic dye molecules, it is opposite, that is, when the optical axis of each negative dichroic dye molecule is perpendicular to the polarization direction of the linearly polarized light beam, the negative dichroic dye molecules may absorb all the linearly polarized light beam; and when the optical axis of each negative dichroic dye molecule is parallel to the polarization direction of the linearly polarized light beam, the negative dichroic dye molecules may allow all the linearly polarized light beam to pass therethrough.

It should be noted that the above 3D spectacle lens 10 may further include an alignment layer 107. After the alignment is completed, the alignment layer 107 may allow the long axis of each liquid crystal molecule 1031 and the optical axis of each dichroic dye molecule 1032 in the guest-host liquid crystal layer 103 of the 3D spectacle lens 10 to form a certain angle with the polarization direction of the linearly polarized light beam, such that when a user watches the display screen at a normal angle by wearing a 3D glasses 1 formed of the 3D spectacle lens 10 provided by an embodiment of the present disclosure, the 3D spectacle lens 10 may be in a non-light-passing through off state or a light-passing through on state in the case where no driving electric field is applied to the 3D spectacle lens 10.

When a user watches the image displayed on the display screen by wearing a 3D glasses 1 formed of the 3D spectacle lens 10 provided by an embodiment of the present disclosure, there are two situations of watching at a normal angle and watching at an inclined angle. The working process of the 3D glasses 1 in two situations will be described in detail hereinafter by taking a case as an example, in which positive liquid crystal molecules and positive dichroic dye molecules are included in the guest-host liquid crystal layer 103 of the above 3D spectacle lens 10.

When the guest-host liquid crystal layer 103 in the 3D spectacle lens 10 is aligned, the long axis of each liquid crystal molecule 1031 and the optical axis of each dichroic dye molecule 1032 in the guest-host liquid crystal layer 103 of the 3D spectacle lens 10 are both parallel to the polarization direction of the linearly polarized light beam, such that the two 3D spectacle lenses 10 included in the 3D glasses 1 are in a non-light-passing through off state before the application of the driving electric field.

In the first situation, a user watches the image displayed by the display screen at a normal angle by wearing a 3D glasses 1 formed of the 3D spectacle lens 10 provided by an embodiment of the present disclosure. When the display screen displays the left-eye frame image, a driving electric field is applied to the first 3D spectacle lens 10 corresponding to the left eye (see FIG. 3), such that the liquid crystal molecules 1031 and the dichroic dye molecules 1032 in the guest-host liquid crystal layer 103 of the first 3D spectacle lens 10 are deflected under the control of the driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the left-eye frame image, thereby allowing the linearly polarized light beam corresponding to the left-eye frame image to pass through the first 3D spectacle lens 10 and to be received by the left eye of a person. Meanwhile, since no driving electric field is applied to the guest-host liquid crystal layer 103 of the second 3D spectacle lens 10 corresponding to the right eye (see FIG. 2), the liquid crystal molecules 1031 and the dichroic dye molecules 1032 in the guest-host liquid crystal layer 103 are not deflected, that is, the long axis of each liquid crystal molecule 1031 and the optical axis of each dichroic dye molecule 1032 in the guest-host liquid crystal layer 103 are maintained to be parallel to the polarization direction of the linearly polarized light beam corresponding to the left-eye frame image, thereby allowing the linearly polarized light beam to be absorbed by the dichroic dye molecules 1032 in the guest-host liquid crystal layer 103 of the second 3D spectacle lens 10, and allowing the second 3D glasses 10 to be in a non-light-passing through off state, so as to allow the left-eye frame image not to be watched by the right eye of the person.

When the display screen displays the right-eye frame image, a driving electric field is applied to the second 3D spectacle lens 10 (see FIG. 3), such that the liquid crystal molecules 1031 and the dichroic dye molecules 1032 in the guest-host liquid crystal layer 103 of the second 3D spectacle lens 10 are deflected under the control of the driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the right-eye frame image, thereby allowing the linearly polarized light beam corresponding to the right-eye frame image to pass through the second 3D spectacle lens 10 and to be received by the right eye of the person. Meanwhile, since no driving electric field is applied to the guest-host liquid crystal layer 103 of the first 3D spectacle lens 10 (see FIG. 2), the liquid crystal molecules 1031 and the dichroic dye molecules 1032 in the guest-host liquid crystal layer 103 are not deflected, that is, the long axis of each liquid crystal molecule 1031 and the optical axis of each dichroic dye molecule 1032 in the guest-host liquid crystal layer 103 are maintained to be parallel to the polarization direction of the linearly polarized light beam corresponding to the right-eye frame image, thereby allowing the linearly polarized light to be absorbed by the dichroic dye molecules 1032 in the guest-host liquid crystal layer 103 of the first 3D spectacle lens 10, and allowing the first 3D glasses 10 to be in a non-light-passing through off state, so as to allow the right-eye frame image not to be watched by the left eye of the person.

In the second situation, a user watches the image displayed by the display screen at a inclined view angle by wearing a 3D glasses 1 formed of the 3D spectacle lens 10 provided by an embodiment of the present disclosure. When the display screen displays the left-eye frame image, a first driving electric field is applied to the guest-host liquid crystal layer 103 in the first 3D spectacle lens corresponding to the left eye, and a second driving electric field is applied to the guest-host liquid crystal layer 103 in the second 3D spectacle lens corresponding to the right eye, such that the liquid crystal molecules 1031 and the dichroic dye molecules 1032 in the guest-host liquid crystal layer 103 of the first 3D spectacle lens are deflected under the control of the first driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the left-eye frame image, thereby allowing all the linearly polarized light beam corresponding to the left-eye frame image to pass through the first 3D spectacle lens and to be received by the left eye of the person. Meanwhile, the liquid crystal molecules 1031 and the dichroic dye molecules 1032 in the guest-host liquid crystal layer 103 of the second 3D spectacle lens 10 are deflected under the control of the second driving electric field, and the long axis of each liquid crystal molecule 1031 and the optical axis of each dichroic dye molecule 1032 in the guest-host liquid crystal layer 103 are respectively parallel to the polarization direction of the linearly polarized light beam corresponding to the left-eye frame image, thereby allowing all the linearly polarized light beam corresponding to the left-eye frame image to be absorbed by the dichroic dye molecules 1032 in the guest-host liquid crystal layer 103 of the second 3D spectacle lens, and allowing the left-eye frame image not to be watched by the right eye of the person.

When the display screen displays the right-eye frame image, a second driving electric field is applied to the guest-host liquid crystal layer 103 in the first 3D spectacle lens, and a first driving electric field is applied to the guest-host liquid crystal layer 103 in the second 3D spectacle lens, such that the liquid crystal molecules 1031 and the dichroic dye molecules 1032 in the guest-host liquid crystal layer 103 of the first 3D spectacle lens are deflected under the control of the second driving electric field, and the long axis of each liquid crystal molecule 1031 and the optical axis of each dichroic dye molecule 1032 in the guest-host liquid crystal layer 103 are respectively parallel to the polarization direction of the linearly polarized light beam corresponding to the right-eye frame image, thereby allowing all the linearly polarized light beam corresponding to the right-eye frame image to be absorbed by the dichroic dye molecules 1032 in the guest-host liquid crystal layer 103 of the first 3D spectacle lens, and allowing the right-eye frame image not to be watched by the left eye of the person. Meanwhile, the liquid crystal molecules 1031 and the dichroic dye molecules 1032 in the guest-host liquid crystal layer 103 of the second 3D spectacle lens are deflected under the control of the first driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the right-eye frame image, thereby allowing all the linearly polarized light beam corresponding to the right-eye frame image to pass through the second 3D spectacle lens and to be received by the right eye of the person.

As can be seen from the specific structure and working principle of the 3D spectacle lens 10, the 3D spectacle lens 10 provided by an embodiment of the present disclosure includes guest-host liquid crystal layer 103. Each of the dichroic dye molecules 1032 in the guest-host liquid crystal layer 103 has a property of anisotropic optical absorbance, and the dichroic dye molecules 1032 may deflect along with the liquid crystal molecules 1031 under the control of the driving electric field. Therefore, in the 3D spectacle lens 10 provided by an embodiment of the present disclosure, the liquid crystal molecules 1031 in the guest-host liquid crystal layer 103 may drive the dichroic dye molecules 1032 to deflect under the control of the driving electric field, such that the optical axis of each dichroic dye molecule 1032 is perpendicular or parallel to the polarization direction of the received linearly polarized light beam, thereby controlling the guest-host liquid crystal layer 103 to allow the received polarized light to pass through or to be absorbed according to actual needs, so as to allow the 3D spectacle lens to switch between a light-passing through state and a non-light-passing through state. Therefore, when a user watches an image by using a 3D glasses 1 formed of the 3D spectacle lens 10 provided by an embodiment of the present disclosure, even if the viewing angle changes, the liquid crystal molecules 1031 in the guest-host liquid crystal layer 103 may still drive the dichroic dye molecules 1032 to deflect under the control of the driving electric field, such that the 3D spectacle lens is still in a light-passing through state or a non-light-passing through state, thereby ensuring the user's viewing quality.

Moreover, since the 3D spectacle lens 10 provided by an embodiment of the present disclosure does not need to be provided with a polarizer, when a 3D glasses 1 formed of the 3D spectacle lens 10 provided by an embodiment of the present disclosure is used to watch a 3D image, the attenuation effect of the polarizer on the light is avoided, thereby ensuring that the 3D glasses 1 has a high transmittance. In addition, since the polarizer is not required to be arranged in front and behind the 3D spectacle lens 10, the 3D glasses 1 formed of the 3D spectacle lens provided by an embodiment of the present disclosure are lighter and thinner, thereby improving the comfort of the human eye when wearing the 3D glasses 1.

It should be noted that when a user's eyes watch the displayed image by wearing the 3D glasses 1 formed of the 3D spectacle lens 10 provided in the above embodiments, the inclined viewing angle is $\varphi$, a corresponding driving electric field may be simultaneously applied to the liquid crystal molecules 1031 in the guest-host liquid crystal layer 103, such that the liquid crystal molecules 1031 drive the dichroic dye molecules 1032 to deflect at an angle of $\varphi$ in a direction opposite to the inclination angle, thereby realizing that when the 3D spectacle lens 10 is in the on state, the long axis of each liquid crystal molecule 1031 and the optical axis of each dichroic dye molecule 1032 are always perpendicular to the polarization direction of the linearly polarized light beam (taking a positive dichroic dye molecule as an example), thereby ensuring that all the linearly polarized light beam pass through the 3D spectacle lens 10. Meanwhile, when the 3D spectacle lens 10 is in the off state, the long axis of each liquid crystal molecule 1031 and the optical axis of each dichroic dye molecule 1032 are always parallel to the polarization direction of the linearly polarized light beam (taking a positive dichroic dye molecule as an example), thereby ensuring that all the linearly polarized light beam is absorbed by the dichroic dye molecules 1032 in the guest-host liquid crystal layer 103 of the 3D spectacle lens 10.

In view of this, when a user wears the 3D glasses 1 formed of the 3D spectacle lens 10 provided by an embodiment of the present disclosure, even if the viewing angle changes, the corresponding deflection of the liquid crystal molecules 1031 and the dichroic dye molecules 1032 may also be controlled by applying a suitable driving electric field, thereby ensuring that the 3D spectacle lens 10 may allow all the linearly polarized light beam to pass through and to be absorbed in a light-passing through state and in a non-light-passing through state respectively. Therefore, when a user wears the 3D glasses 1 formed of the 3D spectacle lens 10 provided by an embodiment of the present disclosure, the viewing quality may be ensured regardless of the viewing angle, thereby greatly improving the viewing comfort and solving the problem in the related art that the 3D glasses 1 has a limited viewing angle.

Optionally, a mass percentage of the dichroic dye molecules 1032 in the guest-host liquid crystal layer 103 provided by the above embodiments is 0.5% to 2.5%.

If the mass percentage of the dichroic dye molecules in the liquid crystal layer is too high, the dye molecules will be not easily dissolved in the liquid crystal, the order parameter will be reduced, the dichroic ratio will be reduced, the contrast will be reduced, the response time of the liquid crystal will be also slowed down, and the photoelectric performance of the guest-host liquid crystal display will be reduced. If the mass percentage of the dichroic dye molecules in the liquid crystal layer is too low, the host-guest effect will be lost, and thus it will fail to function as a guest-host display. Optionally, the mass percentage of the dichroic dye molecules in the guest-host liquid crystal layer is 0.5% to 2.0%. Further optionally, the mass percentage of the dichroic dye molecules in the guest-host liquid crystal layer is 1.0% to 2.0%. Yet further optionally, the mass percentage of the dichroic dye molecules in the guest-host liquid crystal layer is 1.5% to 2.0%. Even further optionally, the mass percentage of the dichroic dye molecules in the guest-host liquid crystal layer is 1.75%.

Specifically, in the manufacture of the guest-host liquid crystal layer 103, the dichroic dye molecules 1032 may be incorporated into a nematic liquid crystal material in a mass percentage of 0.5% to 2.5%, and fully mixed, stirred, and defoamed, followed by conventional liquid crystal injection process or liquid crystal dropping process to manufacture the guest-host liquid crystal layer 103. The mass percentage of the dichroic dye molecules 1032 in the guest-host liquid crystal layer 103 is set as 0.5% to 2.5%, which not only satisfies that the 3D spectacle lens 10 has a relatively high contrast ratio, but also ensures that the liquid crystal molecules 1031 in the guest-host liquid crystal layer 103 have faster response time.

There are various types of dichroic dye molecules 1032 and of the liquid crystal molecules 1031 in the guest-host liquid crystal layer 103. Alternatively, the dichroic dye molecules 1032 include azo dye molecules, and more preferably the dichroic dye molecules 1032 include trans isomer azo dye molecules. The liquid crystal molecule may be selected from a group consisting of ECB type liquid crystal, ADS type liquid crystal, IPS type liquid crystal or FFS type liquid crystal, but are not limited thereto.

Specifically, the azo dye molecule has a higher order parameter, and after the azo dye molecules are mixed with the liquid crystal molecules 1031, the liquid crystal molecules 1031 may align the optical axis of each dispersed azo dye to be parallel to the long axis of each liquid crystal molecule 1031. The phenomenon is "host-guest" effect. Since the dipole moment and the long axis in a trans isomer dye molecule are longer than those in a cis isomer dye molecule, and the cis isomer dye molecule is more similar to the molecular structure of the host, the host-guest interaction in the trans isomer dye molecule is stronger than that in the cis isomer dye molecule, and the arrangement of the trans isomer dye molecule is more effective for producing dichroism than the arrangement of the cis isomer dye molecule. In addition, the order parameter of the cis isomer dye molecule is not very dependent on the liquid crystal phase, while the order parameter of the trans isomer dye molecule is well matched to the parameter of the liquid crystal phase.

Further, dichroism means that the crystal has a function of selective absorption to two light vector components perpendicular to each other. Generally, two polarized lights whose vibrations are perpendicular to each other may be obtained from a natural light beam, in which the two polarized lights have a same amplitude, a same propagation speed and a same propagation direction, but have opposite rotations, and the degree of separation of the two lights depends on the thickness of the crystal. The chiral isomerization in each azo dye molecule not only allows the molecule to have optical activity, but also allows the N=N bond and the benzene ring to form a conjugated large n bond, and reduces the transition level of the electron, so it is easy to obtain good dichroism, polarizing property and a wide range of visible light absorption. The guest-host liquid crystal layer formed of the azo dye molecules has the characteristics of high temperature resistance and high reliability.

Figure 2:
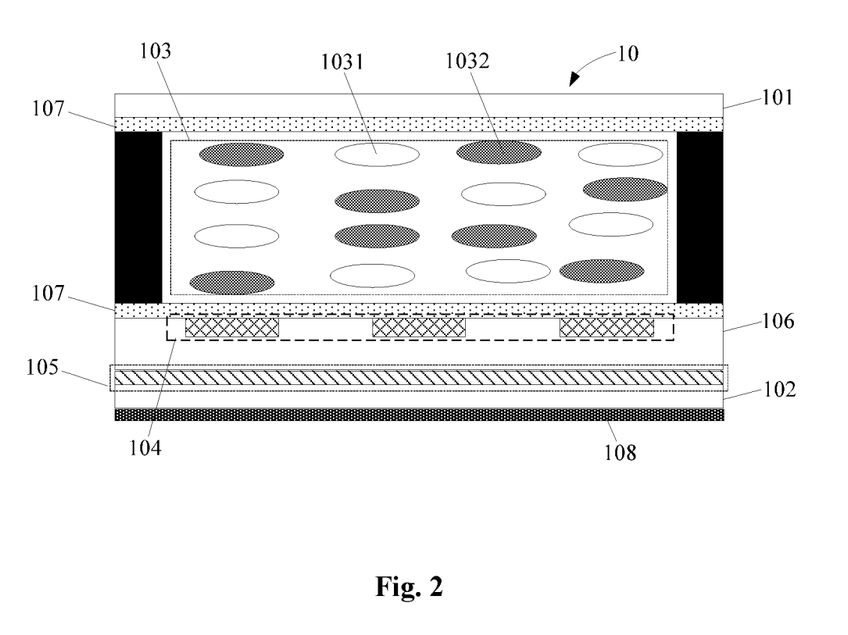
FIG. 2 is a schematic diagram of a 3D spectacle lens in off state according to an embodiment of the present disclosure.
Figure 3:
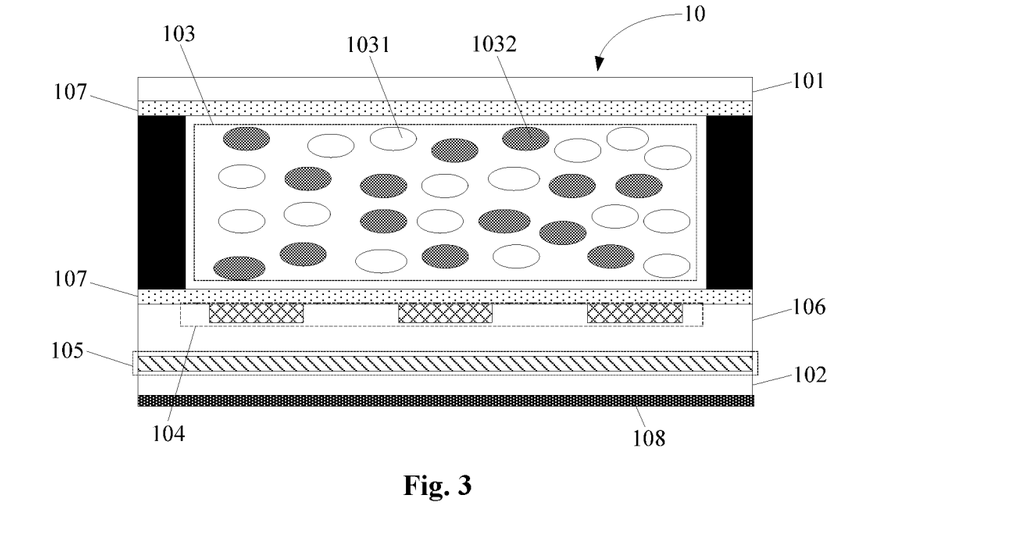
FIG. 3 is a schematic diagram of a 3D spectacle lens in on state according to an embodiment of the present disclosure.

Please continue to refer to FIGS. 2 and 3, the 3D spectacle lens 10 provided by the above embodiments further includes a λ/4 wave plate 108, which is arranged on the light-entering side of the 3D spectacle lens 10 and used for converting the circularly polarized light incident from the outside into a linearly polarized light.

Specifically, the λ/4 wave plate 108 may be arranged on the side of the first substrate 101 away from the guest-host liquid crystal layer 103, or may be arranged on the side of the second substrate 102 away from the guest-host liquid crystal layer 103. The λ/4 wave plate 108 is arranged on the side of the first substrate 101 or the second substrate 102 away from the guest-host liquid crystal layer 103, such that when the light emitted from the display screen is a circularly polarized light, the λ/4 wave plate 108 may convert the circularly polarized light into a linearly polarized light, thereby allowing the converted linearly polarized light to pass through the guest-host liquid crystal layer 103 or to be absorbed by the guest-host liquid crystal layer 103. Therefore, the 3D glasses 1 formed of the 3D spectacle lens 10 provided in the above embodiments may be used in matching with the display screen for emitting a circularly polarized light, such that the application range of the formed 3D glasses 1 is wider.

Please continue to refer to FIGS. 2 and 3, the above 3D spectacle lens 10 further includes: an electrode structure arranged between the guest-host liquid crystal layer 103 and the second substrate 102. The electrode structure includes a first electrode 104 and a second electrode 105 insulated from each other. After an electrical signal is applied to the first electrode 104 and the second electrode 105, a driving electric field may be generated between the first electrode 104 and the second electrode 105.

Specifically, the electrode structure arranged between the guest-host liquid crystal layer 103 and the second substrate 102 may generate a horizontal driving electric field for controlling deflection of the liquid crystal molecules 1031 in the guest-host liquid crystal layer 103.

There are various manners of setting the first electrode 104 and the second electrode 105 described above, and two specific setting manners are provided as follows.

In the first manner, the first electrode 104 and the second electrode 105 are arranged in a same layer and both are comb-like electrodes. Specifically, the first electrode 104 includes a plurality of first sub-electrodes, and the second electrode 105 includes a plurality of second sub-electrodes, in which there is one second sub-electrode between every two adjacent first sub-electrodes, or there is one first sub-electrode between every two adjacent second sub-electrodes, and the adjacent first and second sub-electrodes are insulated from each other.

In operation, a first electrical signal is applied to each of the first sub-electrodes and a second electrical signal is applied to each of the second sub-electrodes, to generate a horizontal driving electric field between the adjacent first sub-electrodes and the second sub-electrodes, such that the liquid crystal molecules 1031 in the guest-host liquid crystal layer 103 may be deflected under the control of the horizontal driving electric field, thereby driving the dichroic dye molecules 1032 to deflect.

In the second manner, as shown in FIGS. 1 and 2, the first electrode 104 and the second electrode 105 are arranged in different layers, and an insulating layer 106 is arranged between the first electrode 104 and the second electrode 105, in which the first electrode 104 is a comb-like electrode and the second electrode 105 is a planar electrode. Specifically, the first electrode 104 includes a plurality of first sub-electrodes spaced from each other, and the orthographic projections of the first sub-electrodes on the second substrate 102 are all located inside the orthographic projection of the second electrode 105 on the second substrate 102.

In operation, a first electrical signal is applied to each of the first sub-electrodes and a second electrical signal is applied to the second electrode 105, to generate a horizontal driving electric field between each of the first sub-electrodes and the second electrode 105, such that the liquid crystal molecules 1031 in the guest-host liquid crystal layer 103 may be deflected under the control of the horizontal driving electric field, thereby driving the dichroic dye molecules 1032 to deflect.

It should be noted that the above first electrode 104 and second electrode 105 may be both selected as an ITO transparent electrode, and the above first substrate 101 and second substrate 102 may be both selected as a transparent glass substrate.

Figure 4:
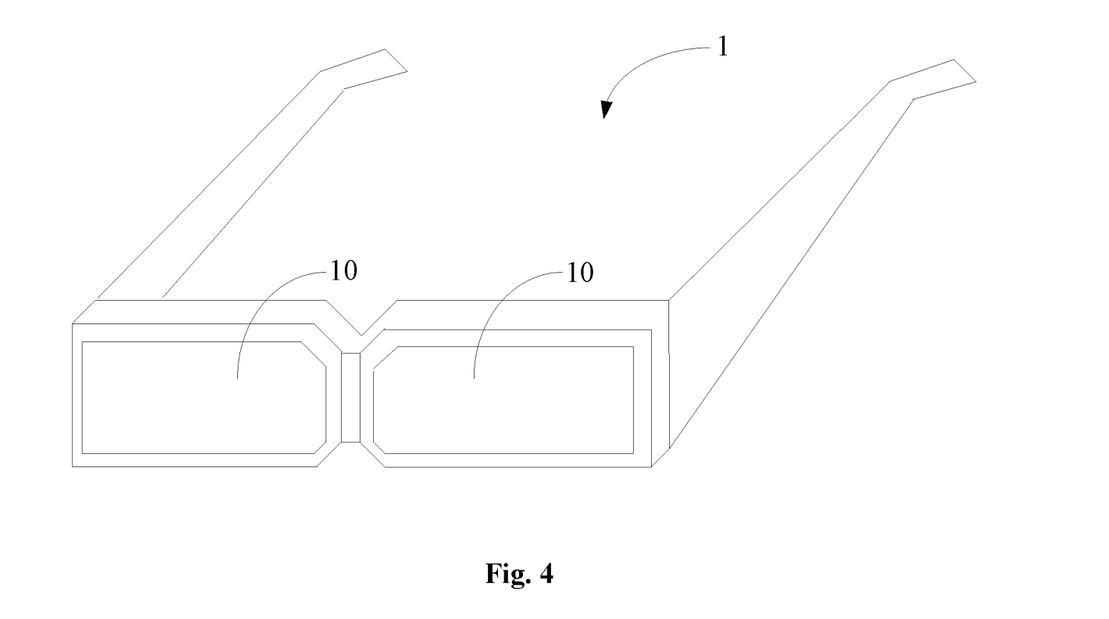
FIG. 4 is a 3D glasses according to an embodiment of the present disclosure.

As shown in FIG. 4, an embodiment of the present disclosure further provides a 3D glasses including the 3D spectacle lens 10 provided by the above embodiment.

Specifically, the 3D glasses 1 provided by an embodiment of the present disclosure includes a first 3D spectacle lens corresponding to the left eye and a second 3D spectacle lens corresponding to the right eye. The working process of the 3D glasses 1 will be described in detail hereinafter by taking a case as an example, in which in the guest-host liquid crystal layer 103 included in each of the 3D spectacle lenses 10, the liquid crystal molecules 1031 are positive liquid crystal molecules 1031, and the dichroic dye molecules 1032 are positive dichroic dye molecules 1032.

In the first situation, a user watches the image displayed by the display screen at a normal angle by wearing a 3D glasses 1 provided by an embodiment of the present disclosure. When the display screen displays the left-eye frame image, a driving electric field is applied to the first 3D spectacle lens 10 corresponding to the left eye (see FIG. 3), such that the liquid crystal molecules 1031 and the dichroic dye molecules 1032 in the guest-host liquid crystal layer 103 of the first 3D spectacle lens 10 are deflected under the control of the driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the left-eye frame image, thereby allowing the linearly polarized light beam corresponding to the left-eye frame image to pass through the first 3D spectacle lens 10 and to be received by the left eye of a person. Meanwhile, since no driving electric field is applied to the guest-host liquid crystal layer 103 of the second 3D spectacle lens 10 corresponding to the right eye (see FIG. 2), the liquid crystal molecules 1031 and the dichroic dye molecules 1032 in the guest-host liquid crystal layer 103 are not deflected, that is, the long axis of each liquid crystal molecule 1031 and the optical axis of each dichroic dye molecule 1032 in the guest-host liquid crystal layer 103 are maintained to be parallel to the polarization direction of the linearly polarized light beam corresponding to the left-eye frame image, thereby allowing the linearly polarized light beam to be absorbed by the dichroic dye molecules 1032 in the guest-host liquid crystal layer 103 of the second 3D spectacle lens 10, and allowing the second 3D glasses 10 to be in a non-light-passing through off state, so as to allow the left-eye frame image not to be watched by the right eye of the person.

When the display screen displays the right-eye frame image, a driving electric field is applied to the second 3D spectacle lens 10 (see FIG. 3), such that the liquid crystal molecules 1031 and the dichroic dye molecules 1032 in the guest-host liquid crystal layer 103 of the second 3D spectacle lens 10 are deflected under the control of the driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the right-eye frame image, thereby allowing the linearly polarized light beam corresponding to the right-eye frame image to pass through the second 3D spectacle lens 10 and to be received by the right eye of the person. Meanwhile, since no driving electric field is applied to the guest-host liquid crystal layer 103 of the first 3D spectacle lens 10 (see FIG. 2), the liquid crystal molecules 1031 and the dichroic dye molecules 1032 in the guest-host liquid crystal layer 103 are not deflected, that is, the long axis of each liquid crystal molecule 1031 and the optical axis of each dichroic dye molecule 1032 in the guest-host liquid crystal layer 103 are maintained to be parallel to the polarization direction of the linearly polarized light beam corresponding to the right-eye frame image, thereby allowing the linearly polarized light beam to be absorbed by the dichroic dye molecules 1032 in the guest-host liquid crystal layer 103 of the first 3D spectacle lens 10, and allowing the first 3D glasses 10 to be in a non-light-passing through off state, so as to allow the right-eye frame image not to be watched by the left eye of the person.

In the second situation, a user watches the image displayed by the display screen at an inclined view angle by wearing a 3D glasses 1 provided by an embodiment of the present disclosure. When the display screen displays the left-eye frame image, a first driving electric field is applied to the guest-host liquid crystal layer 103 in the first 3D spectacle lens corresponding to the left eye, and a second driving electric field is applied to the guest-host liquid crystal layer 103 in the second 3D spectacle lens corresponding to the right eye, such that the liquid crystal molecules 1031 and the dichroic dye molecules 1032 in the guest-host liquid crystal layer 103 of the first 3D spectacle lens are deflected under the control of the first driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the left-eye frame image, thereby allowing all the linearly polarized light beam corresponding to the left-eye frame image to pass through the first 3D spectacle lens and to be received by the left eye of the person. Meanwhile, the liquid crystal molecules 1031 and the dichroic dye molecules 1032 in the guest-host liquid crystal layer 103 of the second 3D spectacle lens 10 are deflected under the control of the second driving electric field, and the long axis of each liquid crystal molecule 1031 and the optical axis of each dichroic dye molecule 1032 in the guest-host liquid crystal layer 103 are respectively parallel to the polarization direction of the linearly polarized light beam corresponding to the left-eye frame image, thereby allowing all the linearly polarized light beam corresponding to the left-eye frame image to be absorbed by the dichroic dye molecules 1032 in the guest-host liquid crystal layer 103 of the second 3D spectacle lens, and allowing the left-eye frame image not to be watched by the right eye of the person.

When the display screen displays the right-eye frame image, a second driving electric field is applied to the guest-host liquid crystal layer 103 in the first 3D spectacle lens, and a first driving electric field is applied to the guest-host liquid crystal layer 103 in the second 3D spectacle lens, such that the liquid crystal molecules 1031 and the dichroic dye molecules 1032 in the guest-host liquid crystal layer 103 of the first 3D spectacle lens are deflected under the control of the second driving electric field, and the long axis of each liquid crystal molecule 1031 and the optical axis of each dichroic dye molecule 1032 in the guest-host liquid crystal layer 103 are respectively parallel to the polarization direction of the linearly polarized light beam corresponding to the right-eye frame image, thereby allowing all the linearly polarized light beam corresponding to the right-eye frame image to be absorbed by the dichroic dye molecules 1032 in the guest-host liquid crystal layer 103 of the first 3D spectacle lens, and allowing the right-eye frame image not to be watched by the left eye of the person. Meanwhile, the liquid crystal molecules 1031 and the dichroic dye molecules 1032 in the guest-host liquid crystal layer 103 of the second 3D spectacle lens are deflected under the control of the first driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the right-eye frame image, thereby allowing all the linearly polarized light beam corresponding to the right-eye frame image to pass through the second 3D spectacle lens and to be received by the right eye of the person.

As can be seen from the specific structure and working principle of the 3D glasses 1 described above, the 3D glasses 1 provided by an embodiment of the present disclosure includes the 3D spectacle lenses 10 provided in the above embodiments. Since the above guest-host liquid crystal layer 103 in the above-mentioned 3D spectacle lens 10 may allow the liquid crystal molecules 1031 to drive the dichroic dye molecules 1032 to deflect under the control of the driving electric field, thereby allowing the guest-host liquid crystal layer 103 to allow the received polarized light to pass through or to be absorbed according to actual needs, so as to allow the 3D spectacle lens to switch between a light-passing through state and a non-light-passing through state. Therefore, when a user watches by wearing the 3D glasses 1 provided by an embodiment of the present disclosure, even if the viewing angle changes, the liquid crystal molecules 1031 in the guest-host liquid crystal layer 103 may still drive the dichroic dye molecules 1032 to deflect under the control of the driving electric field, such that the 3D spectacle lens is still in a light-passing through state or a non-light-passing through state, thereby ensuring that when the user watches a 3D image by wearing the 3D glasses 1 provided by an embodiment of the present disclosure, the viewing quality will not be affected, even if the viewing angle changes.

Moreover, since the 3D spectacle lens 10 provided by the above embodiment does not need to be provided with a polarizer, when a user watches a 3D image by wearing a 3D glasses 1 formed of the 3D spectacle lens 10 provided by an embodiment of the present disclosure, the attenuation effect of the polarizer on the light is avoided, thereby ensuring that the 3D glasses 1 has a high transmittance. In addition, since the polarizer is not required to be arranged in front and behind the above 3D spectacle lens 10, the 3D glasses 1 provided by an embodiment of the present disclosure are lighter and thinner, thereby improving the comfort of the human eye when wearing the 3D glasses 1.

An embodiment of the present disclosure further provides a method for driving the 3D spectacle lens 10 provided by the above embodiments. The method for driving the 3D spectacle lens includes: applying a driving electric field to the guest-host liquid crystal layer 103, such that the liquid crystal molecules 1031 in the guest-host liquid crystal layer 103 drive the dichroic dye molecules 1032 in the guest-host liquid crystal layer 103 to deflect under the control of the driving electric field.

Specifically, a driving electric field is applied to the guest-host liquid crystal layer of the 3D spectacle lens, such that the liquid crystal molecules 1031 in the guest-host liquid crystal layer 103 drive the dichroic dye molecules 1032 to deflect under the control of the driving electric field, thereby allowing the optical axis of each dichroic dye molecule 1032 to be perpendicular or parallel to the polarization direction of the received linearly polarized light beam, such that the dichroic dye molecules 1032 may allow the received linearly polarized light beam to be absorbed or to pass through, so as to allow the 3D spectacle lens to switch between a light-passing through state and a non-light-passing through state.

Optionally, the above applying the driving electric field to the guest-host liquid crystal layer 103, such that the liquid crystal molecules 1031 in the guest-host liquid crystal layer 103 drive the dichroic dye molecules 1032 in the guest-host liquid crystal layer 103 to deflect together under the control of the driving electric field includes:

applying the driving electric field 103 to the guest-host liquid crystal layer such that the optical axis of each dichroic dye molecule 1032 in the 3D spectacle lens 1 is perpendicular to the polarization direction of the received linearly polarized light beam under the control of the driving electric field; or applying the driving electric field 103 to the guest-host liquid crystal layer such that the optical axis of each dichroic dye molecule 1032 in the 3D spectacle lens is parallel to the polarization direction of the received linearly polarized light beam under the control of the driving electric field.

Specifically, when the guest-host liquid crystal layer 103 includes positive liquid crystal molecules and positive dichroic dye molecules, and the driving electric field applied to the guest-host liquid crystal layer 103 allows the optical axis of each dichroic dye molecule 1032 to be perpendicular to the polarization direction of the received polarized light, each dichroic dye molecule 1032 may allow all the received linearly polarized light beam to pass through, thereby realizing that the 3D spectacle lens is in a light-passing through state. When the driving electric field applied to the guest-host liquid crystal layer 103 allows the optical axis of each dichroic dye molecule 1032 to be parallel to the polarization direction of the received polarized light, the dichroic dye molecule 1032 may receive all the received linearly polarized light, thereby realizing that the 3D spectacle lens is in a non-light-passing through state.

When the guest-host liquid crystal layer 103 includes negative liquid crystal molecules and negative dichroic dye molecules, the driving electric field applied to the guest-host liquid crystal layer 103 allows the optical axis of each dichroic dye molecule 1032 to be parallel to the polarization direction of the received polarized light, and allows each dichroic dye molecule 1032 to allow all the received linearly polarized light to pass through the 3D spectacle lens, thereby realizing that the 3D spectacle lens is in a light-passing through state. When the driving electric field applied to the guest-host liquid crystal layer 103 allows the optical axis of each dichroic dye molecule 1032 to be perpendicular to the polarization direction of the received polarized light, the dichroic dye molecule 1032 may absorb all the received linearly polarized light, thereby realizing that the 3D spectacle lens is in a non-light-passing through state.

In method for driving the 3D spectacle lens provided by an embodiment of the present disclosure, the method includes applying the driving electric field to the guest-host liquid crystal layer 103, the liquid crystal molecules 1031 in the guest-host liquid crystal layer 103 may drive the dichroic dye molecules 1032 to deflect under the control of the driving electric field, such that the optical axis of each dichroic dye molecule 1032 is perpendicular or parallel to the polarization direction of the received linearly polarized light beam, thereby controlling the guest-host liquid crystal layer 103 to allow the received polarized light to pass therethrough or to be absorbed according to actual needs, so as to allow the 3D spectacle lens to switch between a light-passing through state and a non-light-passing through state. Therefore, when the driving method provided by an embodiment of the present disclosure is used to drive the 3D spectacle lens, even if the viewing angle changes, the liquid crystal molecules 1031 in the guest-host liquid crystal layer 103 may still drive the dichroic dye molecules 1032 to deflect under the control of the driving electric field, such that the 3D spectacle lens is still in a light-passing through state or a non-light-passing through state, thereby ensuring the user's viewing quality.

An embodiment of the present disclosure further provides a method for driving the 3D glasses provided by the above embodiments, the above 3D glasses includes a first 3D spectacle lens and a second 3D spectacle lens; and the method for driving the 3D glasses includes:

determining a target 3D spectacle lens from the first 3D spectacle lens and the second 3D spectacle lens; and applying a first driving electric field to a target guest-host liquid crystal layer in the target 3D spectacle lens such that the target 3D spectacle lens is capable of allowing the received linearly polarized light beam to pass therethrough.

Specifically, the determining the target 3D spectacle lens from the first 3D spectacle lens and the second 3D spectacle lens is as follows: the first 3D spectacle lens is set to correspond to the left eye of the user, and the second 3D spectacle lens is set to correspond to the right eye of the user. When a user watches the image displayed in the display screen by wearing a 3D glasses provided by the above embodiments, in the case that the display screen displays the left-eye frame image corresponding to the first 3D spectacle lens, it may be determined that the first 3D spectacle lens is the target 3D spectacle lens; and in the case that the display screen displays the right-eye frame image corresponding to the second 3D spectacle lens, it may be determined that the second 3D spectacle lens is the target 3D spectacle lens.

Specifically, the applying the first driving electric field to the target guest-host liquid crystal layer in the target 3D spectacle lens such that the target 3D spectacle lens is capable of allowing the received linearly polarized light beam to pass therethrough is as follows: after the target 3D spectacle lens is determined, the first driving electric field may be directly applied to the target guest-host liquid crystal layer in the target 3D spectacle lens. The liquid crystal molecules 1031 in the target guest-host liquid crystal layer drive the dichroic dye molecules 1032 in the target guest-host liquid crystal layer to deflect under the control of the first driving electric field, thereby allowing the target 3D spectacle lens to be in an on state and to allow the received linearly polarized light beam to pass therethrough.

The method for driving the 3D glasses provided by the above embodiments further includes:

determining a non-target 3D spectacle lens from the first 3D spectacle lens and the second 3D spectacle lens; and applying a second driving electric field to a non-target guest-host liquid crystal layer in the non-target 3D spectacle lens, such that the non-target 3D spectacle lens is incapable of allowing the received linearly polarized light beam to pass therethrough.

Specifically, the determining a non-target 3D spectacle lens from the first 3D spectacle lens and the second 3D spectacle lens is as follows: under the premise that the first 3D spectacle lens is set to correspond to the left eye of the user, and the second 3D spectacle lens is set to correspond to the right eye of the user, when a user watches the image displayed in the display screen by wearing a 3D glasses provided by the above embodiments, in the case that the display screen displays the left-eye frame image corresponding to the first 3D spectacle lens, it may be determined that the second 3D spectacle lens is the non-target 3D spectacle lens; and in the case that the display screen displays the right-eye frame image corresponding to the second 3D spectacle lens, it may be determined that the first 3D spectacle lens is the non-target 3D spectacle lens.

Specifically, the applying the second driving electric field to the non-target guest-host liquid crystal layer in the non-target 3D spectacle lens, such that the non-target 3D spectacle lens is incapable of allowing the received linearly polarized light beam to pass therethrough is as follows: after the non-target 3D spectacle lens is determined, the second driving electric field may be directly applied to the non-target guest-host liquid crystal layer in the non-target 3D spectacle lens. The liquid crystal molecules 1031 in the non-target guest-host liquid crystal layer drive the dichroic dye molecules 1032 in the non-target guest-host liquid crystal layer to deflect under the control of the second driving electric field, thereby allowing the non-target 3D spectacle lens to be in an off state and not to allow the received linearly polarized light beam to pass therethrough.

Alternatively, when the alignment layer 107 is arranged in the 3D spectacle lens 10 included in the 3D glasses 1 provided in the above embodiments, after the alignment is completed, the length of each liquid crystal molecule 1031 in the guest-host liquid crystal layer 103 of the 3D spectacle lens 10 and the optical axis of each axial and dichroic dye molecule 1032 may formed a certain angle with the polarization direction of the linearly polarized light beam, so as to satisfy that when a user watches an image displayed by the display screen at a normal angle by wearing a 3D glasses 1 provided in the above embodiments, in the case that no driving electric field is applied to the 3D spectacle lens 10, the 3D spectacle lens 10 included in the 3D glasses 1 may allow the received linearly polarized light beam to be absorbed or to pass therethrough.

More specifically, taking a case as an example, in which the positive liquid crystal molecules and the positive dichroic dye molecules are included in the guest-host liquid crystal layer 103 of the first 3D spectacle lens and the second 3D spectacle lens, after the alignment is completed, the long axis of each liquid crystal molecule 1031 and the optical axis of each dichroic dye molecule 1032 in the guest-host liquid crystal layer 103 of the first 3D spectacle lens and the second 3D spectacle lens may be both parallel to the polarization direction of the received linearly polarized light beam, such that when no electric field is applied to the guest-host liquid crystal layer 103 in the first 3D spectacle lens and the second 3D spectacle lens, neither the first 3D spectacle lens nor the second 3D spectacle lens may allow the received linearly polarized light beam to pass therethrough. In the situation that a user watches the image displayed by the display screen at a normal angle by wearing a 3D glasses provided by the above embodiments, when the driving method provided by an embodiment of the present disclosure is used to drive the 3D glasses provided by the above embodiments, a first driving electric field may be only applied to the target 3D spectacle lens, and a second driving electric field is not required to apply to the non-target 3D spectacle lens.

In addition, after the alignment is completed, the long axis of each liquid crystal molecule 1031 and the optical axis of each dichroic dye molecule 1032 in the guest-host liquid crystal layer 103 of the first 3D spectacle lens and the second 3D spectacle lens may be also perpendicular to the polarization direction of the received linearly polarized light beam, such that when no electric field is applied to the guest-host liquid crystal layer 103 in the first 3D spectacle lens and the second 3D spectacle lens, the first 3D spectacle lens and the second 3D spectacle lens may both allow the received linearly polarized light beam to pass therethrough. In the situation that a user watches the image displayed by the display screen at a normal angle by wearing a 3D glasses provided by the above embodiments, when the driving method provided by an embodiment of the present disclosure is used to drive the 3D glasses provided by the above embodiments, a second driving electric field may be only applied to the non-target 3D spectacle lens, and a first driving electric field is not required to apply to the target 3D spectacle lens.

The working process of the 3D glasses 1 will be described in detail hereinafter by taking a case as an example, in which the positive liquid crystal molecules and the positive dichroic dye molecules are included in the guest-host liquid crystal layer 103 of the above 3D spectacle lens 10, and when no electric field is applied to the guest-host liquid crystal layer 103 in the first 3D spectacle lens and the second 3D spectacle lens, neither the first 3D spectacle lens nor the second 3D spectacle lens may allow the received linearly polarized light beam to pass therethrough.

In the situation that a user watches the image displayed by the display screen at a normal angle by wearing a 3D glasses 1 provided by the above embodiments. When the display screen displays the left-eye frame image, a driving electric field is applied to the first 3D spectacle lens 10 (see FIG. 3), such that the liquid crystal molecules 1031 and the dichroic dye molecules 1032 in the guest-host liquid crystal layer 103 of the first 3D spectacle lens 10 are deflected under the control of the driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the left-eye frame image, thereby allowing the linearly polarized light beam corresponding to the left-eye frame image to pass through the first 3D spectacle lens 10 and be received by the left eye of a person. Meanwhile, since no driving electric field is applied to the guest-host liquid crystal layer 103 of the second 3D spectacle lens 10 corresponding to the right eye (see FIG. 2), the liquid crystal molecules 1031 and the dichroic dye molecules 1032 in the guest-host liquid crystal layer 103 are not deflected, that is, the long axis of each liquid crystal molecule 1031 and the optical axis of each dichroic dye molecule 1032 in the guest-host liquid crystal layer 103 are maintained to be parallel to the polarization direction of the linearly polarized light beam corresponding to the left-eye frame image, thereby allowing the linearly polarized light beam to be absorbed by the dichroic dye molecules 1032 in the guest-host liquid crystal layer 103 of the second 3D spectacle lens 10, and allowing the second 3D glasses 10 to be in a non-light-passing through off state, so as to allow the left-eye frame image not to be watched by the right eye of the person.

When the display screen displays the right-eye frame image, a driving electric field is applied to the second 3D spectacle lens 10 (see FIG. 3), such that the liquid crystal molecules 1031 and the dichroic dye molecules 1032 in the guest-host liquid crystal layer 103 of the second 3D spectacle lens 10 are deflected under the control of the driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the right-eye frame image, thereby allowing the linearly polarized light beam corresponding to the right-eye frame image to pass through the second 3D spectacle lens 10 and to be received by the right eye of the person. Meanwhile, since no driving electric field is applied to the guest-host liquid crystal layer 103 of the first 3D spectacle lens 10 (see FIG. 2), the liquid crystal molecules 1031 and the dichroic dye molecules 1032 in the guest-host liquid crystal layer 103 are not deflected, that is, the long axis of each liquid crystal molecule 1031 and the optical axis of each dichroic dye molecule 1032 in the guest-host liquid crystal layer 103 are maintained to be parallel to the polarization direction of the linearly polarized light beam corresponding to the right-eye frame image, thereby allowing the linearly polarized light beam to be absorbed by the dichroic dye molecules 1032 in the guest-host liquid crystal layer 103 of the first 3D spectacle lens 10, and allowing the first 3D glasses 10 to be in a non-light-passing through off state, so as to allow the right-eye frame image not to be watched by the left eye of the person.

In the situation that a user watches the image displayed by the display screen at a inclined view angle by wearing a 3D glasses 1 provided by the above embodiments, when the display screen displays the left-eye frame image, a first driving electric field is applied to the guest-host liquid crystal layer 103 in the first 3D spectacle lens corresponding to the left eye, and a second driving electric field is applied to the guest-host liquid crystal layer 103 in the second 3D spectacle lens corresponding to the right eye, such that the liquid crystal molecules 1031 and the dichroic dye molecules 1032 in the guest-host liquid crystal layer 103 of the first 3D spectacle lens are deflected under the control of the first driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the left-eye frame image, thereby allowing all the linearly polarized light beam corresponding to the left-eye frame image to be transmitted through the first 3D spectacle lens and be received by the left eye of the person. Meanwhile, the liquid crystal molecules 1031 and the dichroic dye molecules 1032 in the guest-host liquid crystal layer 103 of the second 3D spectacle lens 10 are deflected under the control of the second driving electric field, and the long axis of each liquid crystal molecule 1031 and the optical axis of each dichroic dye molecule 1032 in the guest-host liquid crystal layer 103 are respectively parallel to the polarization direction of the linearly polarized light beam corresponding to the left-eye frame image, thereby allowing all the linearly polarized light beam corresponding to the left-eye frame image to be absorbed by the dichroic dye molecules 1032 in the guest-host liquid crystal layer 103 of the second 3D spectacle lens, and allowing the left-eye frame image not to be watched by the right eye of the person.

When the display screen displays the right-eye frame image, a second driving electric field is applied to the guest-host liquid crystal layer 103 in the first 3D spectacle lens, and a first driving electric field is applied to the guest-host liquid crystal layer 103 in the second 3D spectacle lens, such that the liquid crystal molecules 1031 and the dichroic dye molecules 1032 in the guest-host liquid crystal layer 103 of the first 3D spectacle lens are deflected under the control of the second driving electric field, and the long axis of each liquid crystal molecule 1031 and the optical axis of each dichroic dye molecule 1032 in the guest-host liquid crystal layer 103 are respectively parallel to the polarization direction of the linearly polarized light beam corresponding to the right-eye frame image, thereby allowing all the linearly polarized light beam corresponding to the right-eye frame image to be absorbed by the dichroic dye molecules 1032 in the guest-host liquid crystal layer 103 of the first 3D spectacle lens, and allowing the right-eye frame image not to be watched by the left eye of the person. Meanwhile, the liquid crystal molecules 1031 and the dichroic dye molecules 1032 in the guest-host liquid crystal layer 103 of the second 3D spectacle lens are deflected under the control of the first driving electric field, and the long axis of each liquid crystal molecule 1031 and the optical axis of each dichroic dye molecule 1032 in the guest-host liquid crystal layer 103 are respectively perpendicular to the polarization direction of the linearly polarized light beam corresponding to the right-eye frame image, thereby allowing all the linearly polarized light beam corresponding to the right-eye frame image to be transmitted through the second 3D spectacle lens and be received by the right eye of the person.

According to the above specific process for driving the 3D glasses by the method for driving the 3D glasses provided by an embodiment of the present disclosure, the method for driving the 3D glasses provided by an embodiment of the present disclosure may determine the target 3D spectacle lens and the non-target 3D spectacle lens from the first 3D spectacle lens and the second 3D spectacle lens, and respectively apply a first driving electric field and a second driving electric field to the target 3D spectacle lens and the non-target 3D spectacle lens, such that when a user watches by using the 3D glasses 1 provided by an embodiment of the present disclosure, even if the viewing angle changes, the liquid crystal molecules 1031 in the guest-host liquid crystal layer 103 may still drive the dichroic dye molecules 1032 to deflect under the control of the corresponding driving electric field, such that the target 3D spectacle lens may always be in a light-passing through state and the non-target 3D spectacle lens may always be in a non-light-passing through state, thereby ensuring that when the user watches by using the 3D glasses 1 formed of the 3D spectacle lens 10 provided by an embodiment of the present disclosure, the effect of the 3D image will not change and thus the user's viewing quality is guaranteed, even if the viewing angle changes.

It should be noted that each embodiment in the present specification is described in a progressive manner, and the same or similar parts among the various embodiments may be referred to each other, and each embodiment focuses on differences from other embodiments. In particular, as for the method embodiments, since they are basically similar to the product embodiments, the description thereof is relatively simple, and the relevant parts may be referred to description of the product embodiments.

Unless otherwise defined, technical terms or scientific terms used herein have the normal meaning commonly understood by one skilled in the art in the field of the present disclosure. The words "first", "second", and the like used in the present disclosure does not denote any order, quantity, or importance, but rather merely serves to distinguish different components. The "including", "comprising", and the like used in the present disclosure means that the element or item appeared in front of the word encompasses the element or item and their equivalents listed after the word, and does exclude other elements or items. The word "connected" or "connecting" and the like are not limited to physical or mechanical connections, but may include electrical connections, whether direct or indirect. "On", "under", "left", "right" and the like are only used to represent relative positional relationships, and when the absolute position of the described object is changed, the relative positional relationship may also be changed, accordingly.

It will be understood that when an element, such as a layer, film, area, or substrate, is referred to as being "on" or "under" another element, the element can be directly "on" or "under" another element, or there may be an intermediate element.

In the description of the above embodiments, the specific features, structures, materials or features may be combined in any suitable manner in any one or more embodiments or examples.

The above description is merely the specific embodiment of the present disclosure, but the scope of the present disclosure is not limited thereto. Moreover, any person skilled in the art would readily conceive of modifications or substitutions within the technical scope of the present disclosure, and these modifications or substitutions shall also fall within the protection scope of the present disclosure. Therefore, the protection scope of the present disclosure should be determined by the scope of the claims.

What is claimed is:

1. A three-dimensional (3D) spectacle lens, comprising:
   a first substrate and a second substrate arranged opposite to each other;
   a guest-host liquid crystal layer arranged between the first substrate and the second substrate, the guest-host liquid crystal layer comprising liquid crystal molecules and dichroic dye molecules; and
   an electrode structure arranged between the guest-host liquid crystal layer and the second substrate,
   wherein the electrode structure comprises a first electrode and a second electrode insulated from each other, and the first electrode and the second electrode are located on a same side of the guest-host liquid crystal layer, wherein the first electrode and the second electrode are arranged in different layers, an insulating layer is arranged between the first electrode and the second electrode, and the first electrode is a comb-like electrode and the second electrode is a planar electrode, and wherein the first electrode includes a plurality of first sub-electrodes spaced from each other, and orthographic projections of the first sub-electrodes on the second substrate are all located inside an orthographic projection of the second electrode on the second substrate.

2. The 3D spectacle lens of claim 1, wherein a mass percentage of the dichroic dye molecules in the guest-host liquid crystal layer is 0.5% to 2.5%.

3. The 3D spectacle lens of claim 1, wherein the dichroic dye molecules comprise azo dye molecules.

4. The 3D spectacle lens of claim 1, wherein the dichroic dye molecules comprise a trans isomer azo dye molecules.

5. The 3D spectacle lens of claim 1, wherein the 3D spectacle lens further comprises a λ/4 wave plate arranged on a light-entering side of the 3D spectacle lens.

6. The 3D spectacle lens of claim 1, wherein the first electrode and the second electrode are arranged in a same layer and both are comb-like electrodes.

7. The 3D spectacle lens of claim 1, wherein the 3D spectacle lens further comprises an alignment layer arranged between the first substrate and the second substrate and on both sides of the guest-host liquid crystal layer.

8. 3D glasses, comprising the 3D spectacle lens of claim 1.

9. The 3D glasses of claim 8, wherein a mass percentage of the dichroic dye molecules in the guest-host liquid crystal layer is 0.5% to 2.5%.

10. The 3D glasses of claim 8, wherein the dichroic dye molecules comprise azo dye molecules.

11. The 3D glasses of claim 8, wherein the dichroic dye molecules comprise trans isomer azo dye molecules.

12. The 3D glasses of claim 8, wherein the 3D spectacle lens further comprises a λ/4 wave plate arranged on a light-entering side of the 3D spectacle lens.

13. A method for driving the 3D spectacle lens of claim 1, comprising:
    applying a driving electric field to the guest-host liquid crystal layer such that the liquid crystal molecules in the guest-host liquid crystal layer drive the dichroic dye molecules in the guest-host liquid crystal layer to deflect under the control of the driving electric field.

14. The method of claim 13, wherein the applying the driving electric field to the guest-host liquid crystal layer such that the liquid crystal molecules in the guest-host liquid crystal layer drive the dichroic dye molecules in the guest-host liquid crystal layer to deflect under the control of the driving electric field comprises:
    applying the driving electric field to the guest-host liquid crystal layer such that an optical axis of each dichroic dye molecule in the 3D spectacle lens is perpendicular to a polarization direction of a received linearly polarized light beam under the control of the driving electric field; or
    applying the driving electric field to the guest-host liquid crystal layer such that an optical axis of each the dichroic dye molecule in the 3D spectacle lens is parallel to a polarization direction of a received linearly polarized light beam under the control of the driving electric field.

15. A method for driving the 3D glasses of claim 8, the 3D glasses comprising a first 3D spectacle lens and a second 3D spectacle lens, the method comprising:
- determining a target 3D spectacle lens from the first 3D spectacle lens and the second 3D spectacle lens; and
- applying a first driving electric field to a target guest-host liquid crystal layer in the target 3D spectacle lens, such that the target 3D spectacle lens is capable of allowing a received linearly polarized light beam to pass therethrough.

16. The method of claim 15, further comprising:
- determining a non-target 3D spectacle lens from the first 3D spectacle lens and the second 3D spectacle lens; and
- applying a second driving electric field to a non-target guest-host liquid crystal layer in the non-target 3D spectacle lens, such that the non-target 3D spectacle lens is incapable of allowing a received linearly polarized light beam to pass therethrough.

* * * * *